United States Patent
Coleman et al.

(10) Patent No.: US 10,737,303 B2
(45) Date of Patent: Aug. 11, 2020

(54) NUTPLATE PREPARATION LASER SYSTEM

(71) Applicant: Lockheed Martin Corporation, Bethesda, MD (US)

(72) Inventors: David Haynes Coleman, Fort Worth, TX (US); Caroline Rebecca Mitchell, Atlanta, GA (US); Michael Bryan Stoddard, Fort Worth, TX (US); Steven E. Twaddle, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 267 days.

(21) Appl. No.: 15/631,001

(22) Filed: Jun. 23, 2017

(65) Prior Publication Data
US 2018/0369879 A1     Dec. 27, 2018

(51) Int. Cl.
| | | |
|---|---|---|
| B08B 7/00 | (2006.01) | |
| B23K 26/06 | (2014.01) | |
| B23K 26/08 | (2014.01) | |
| B23K 26/36 | (2014.01) | |
| F16B 37/04 | (2006.01) | |
| B29C 70/68 | (2006.01) | |

(52) U.S. Cl.
CPC ........ *B08B 7/0042* (2013.01); *B23K 26/0648* (2013.01); *B23K 26/0838* (2013.01); *B23K 26/36* (2013.01); *B29C 70/683* (2013.01); *F16B 37/044* (2013.01)

(58) Field of Classification Search
None
See application file for complete search history.

(56) References Cited

U.S. PATENT DOCUMENTS

| | | | |
|---|---|---|---|
| 4,584,455 | A | 4/1986 | Tomizawa |
| 4,861,407 | A | 8/1989 | Volkmann et al. |
| 4,898,650 | A | 2/1990 | Wu et al. |
| 5,013,391 | A | 5/1991 | Hutter, III et al. |

(Continued)

FOREIGN PATENT DOCUMENTS

| | | |
|---|---|---|
| EP | 1 297 906 A1 | 4/2003 |
| FR | 2727780 | 6/1996 |

(Continued)

OTHER PUBLICATIONS

Laser Cleaning Surface Preparation for Bonded Nutplates on Metallic Structure, speaker Michael Stoddard. http://aerodefevent.com/sessions/laser-cleaning-surface-preparation-bonded-nutplates-metallic-structure/, Mar. 26-29, 2018.

(Continued)

*Primary Examiner* — Eric W Golightly
*Assistant Examiner* — Arlyn I Rivera-Cordero
(74) *Attorney, Agent, or Firm* — Baker Botts L.L.P.

(57) ABSTRACT

A system includes a laser configured to conduct a cleaning cycle that includes producing a laser beam capable of cleaning a faying surface of each of a plurality of nutplates, and conducting a first pass to clean each of the faying surfaces, wherein the laser is at a first position having a first angle relative to an axis orthogonal to the faying surfaces during the first pass. The system also includes a nutplate tray configured to hold the plurality of nutplates such that each faying surface is oriented such that the laser beam is capable of contacting each faying surface at least once during the cleaning cycle.

11 Claims, 4 Drawing Sheets

(56) References Cited

U.S. PATENT DOCUMENTS

| | | | |
|---|---|---|---|
| 5,780,806 A | 7/1998 | Ferguson et al. | |
| 6,488,805 B1 | 12/2002 | Sauer | |
| 6,576,867 B1 * | 6/2003 | Lu .................. | B08B 7/0042 |
| | | | 219/121.69 |
| 7,525,065 B2 | 4/2009 | Engler et al. | |
| 8,536,483 B2 | 9/2013 | Thomas et al. | |
| 8,740,152 B1 | 1/2014 | Lyon et al. | |
| 9,370,842 B2 | 6/2016 | Thomas et al. | |
| 2015/0189891 A1 | 7/2015 | Haas et al. | |
| 2015/0225891 A1 * | 8/2015 | Clowes ............ | B08B 7/0042 |
| | | | 8/137 |
| 2015/0306705 A1 | 10/2015 | Bourgois | |
| 2016/0100498 A1 | 4/2016 | Jiao | |

FOREIGN PATENT DOCUMENTS

| | | | | |
|---|---|---|---|---|
| WO | WO 86/07568 | | 12/1986 | |
| WO | WO-2013141810 A1 * | 9/2013 | ........... | B08B 7/0042 |
| WO | WO 2016/025701 | | 2/2016 | |

OTHER PUBLICATIONS

EP Communication, extended European search report, Ref. JL-94550P. EPP, Application No. 18171999.8-1019, dated Nov. 27, 2018.

\* cited by examiner

NUTPLATE PREPARATION LASER SYSTEM

TECHNICAL FIELD

This disclosure relates in general to nutplate preparation, and more specifically to laser systems for nutplate preparation.

BACKGROUND

Nutplates are often used to create a binding location on a surface, such as on aircraft, boats, etc. An example nutplate contains a nut connected to a plate, where the plate attaches to a surface and the nut provides a location to accept a bolt passing through the surface (a binding location). Nutplates can sometimes be found on the inside of surfaces, such as on the inside surface of an aircraft body or boat hull, where it is difficult or impossible to place a nut after the surface is assembled or placed on the body or hull without causing damage. The plate of the nutplate is often attached to the surface, sometimes with an adhesive, and thus, the cleaner the plate of the nutplate, the more reliable or strong the bond between the plate and the surface in some instances.

SUMMARY OF THE DISCLOSURE

According to one embodiment, a system includes a laser configured to conduct a cleaning cycle that includes producing a laser beam capable of cleaning a faying surface of each of a plurality of nutplates, and conducting a first pass to clean each of the faying surfaces, wherein the laser is at a first position having a first angle relative to an axis orthogonal to the faying surfaces during the first pass. The system also includes a nutplate tray configured to hold the plurality of nutplates such that each faying surface is oriented such that the laser beam is capable of contacting each faying surface at least once during the cleaning cycle.

According to another embodiment, a method includes placing a plurality of parts in a tray configured to hold the plurality of parts and orienting the tray such that a faying surface of each of the plurality of parts is oriented such that a laser beam from a laser is capable of contacting each faying surface at least once during a cleaning cycle. The method also includes conducting the cleaning cycle, which includes producing, by the laser, the laser beam capable of cleaning a faying surface of each of a plurality of parts, and conducting a first pass to clean each of the faying surfaces, wherein the laser is at a first position having a first angle relative to an axis orthogonal to the faying surfaces during the first pass.

Technical advantages of certain embodiments may include systems and methods for obtaining cleaner nutplates and other parts, and in particular cleaner faying surfaces on nutplates and other parts. By obtaining cleaner faying surfaces, parts such as nutplates can be more securely attached to surfaces, especially when adhesives are applied to the faying surfaces. In addition, systems and methods of this disclosure may more efficiently and/or quickly clean multiple parts such as nutplates at the same time compared to other systems and methods. Furthermore, parts such as nutplates are often sent to manufactures in special expensive packaging, such as vacuum sealed aluminum pouches to avoid contamination. By using certain embodiments of this disclosure, the need to use expensive special packaging may be reduced, thus reducing the cost of nutplates.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

In every-day life, nutplates are often used to create a binding location on a surface, such as on aircraft, boats, etc. An example nutplate contains a nut connected to a plate, where the plate attaches to a surface and the nut provides a location to accept a bolt passing through the surface (a binding location). Nutplates can sometimes be found on the inside of surfaces, such as on the inside surface of an aircraft body or boat hull, where it is difficult or impossible to place a nut after the surface is assembled or placed on the body or hull. The plate of the nutplate is often attached to the surface, sometimes with an adhesive, and thus, the cleaner the plate of the nutplate, the more reliable or strong the bond between the plate and the surface in some instances.

Certain embodiments of the present disclosure describe systems and methods of cleaning nutplate surfaces, such as nutplate faying surfaces. A faying surface on a nutplate is generally a surface that forms part of a joint or attachment to another surface. For example, adhesives are sometimes placed on a faying surface of a nutplate, and then the faying surface is pressed against a surface to which the nutplate will be bound.

Laser cleaning, which may be partially or fully automated according to certain embodiments of this disclosure, may help clean faying surfaces more thoroughly than other techniques, such as types of grit blasting or sanding. For example, nutplates may be placed in a nutplate tray such that the faying surfaces of the nutplates are oriented towards a laser. The laser may then shoot a laser beam at the array of nutplates in the tray while moving relative to the nutplate tray in a pattern during one or more passes. When the laser contacts the faying surfaces of the nutplates, it cleans (e.g., removes contaminants from) the faying surfaces.

Technical advantages of certain embodiments may include systems and methods for obtaining cleaner nutplates, and in particular cleaner faying surfaces on nutplates. By obtaining cleaner faying surfaces, nutplates can be more securely attached to surfaces, especially when adhesives are applied to the faying surfaces. In addition, systems and methods of this disclosure may more efficiently and/or quickly clean multiple nutplates at the same time compared to other systems and methods. Furthermore, certain embodiments of this disclosure may reduce the need to use expensive special packaging for nutplates, thus reducing the cost of nutplates. Other technical advantages will be readily apparent to one skilled in the art from the following figures, descriptions, and claims. Moreover, while specific advantages have been enumerated above, various embodiments may include all, some, or none of the enumerated advantages.

Figure 1A:
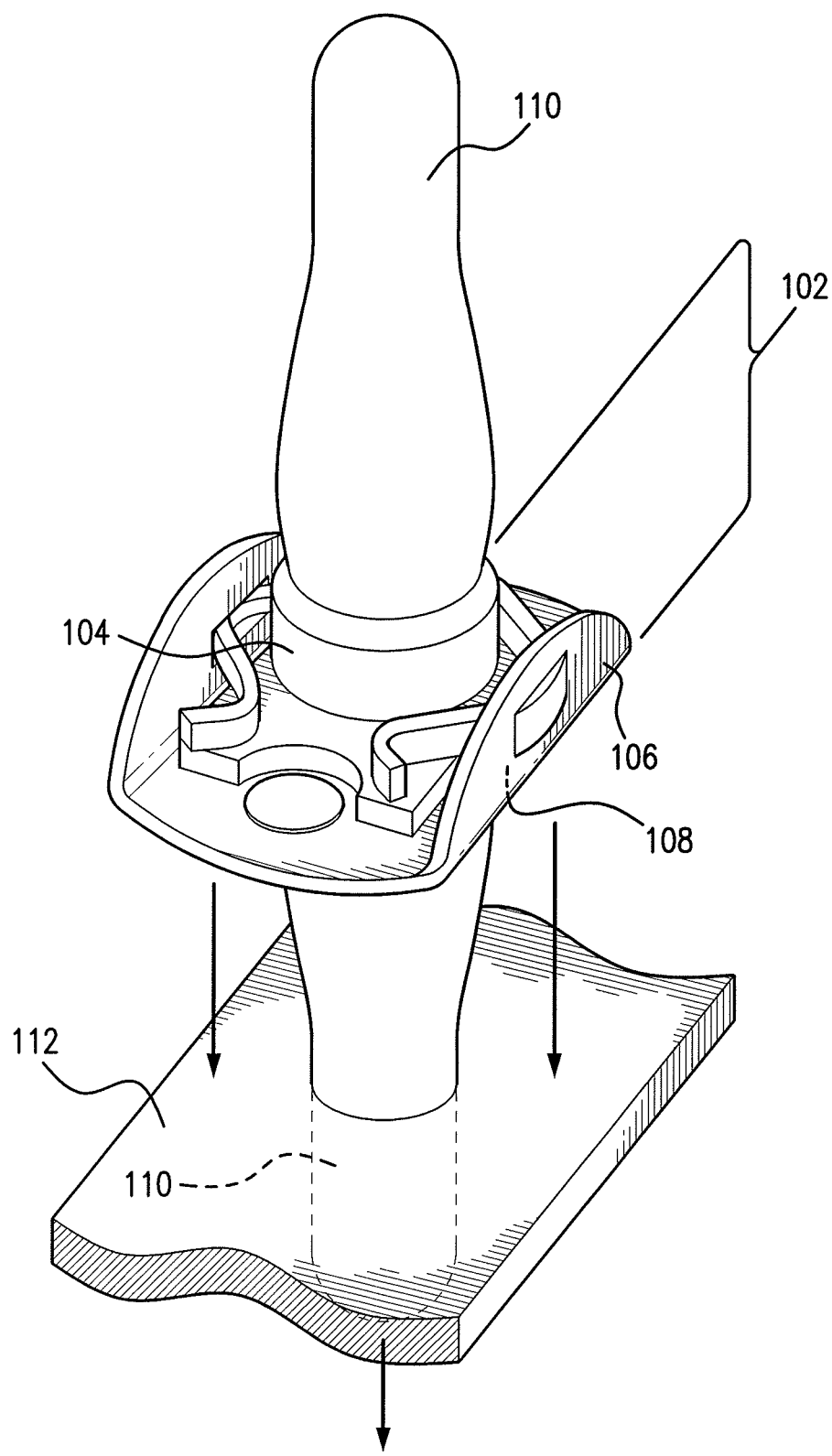
FIGS. 1A and 1B illustrate an example nutplate and surface, according to a particular embodiment.
Figure 1B:
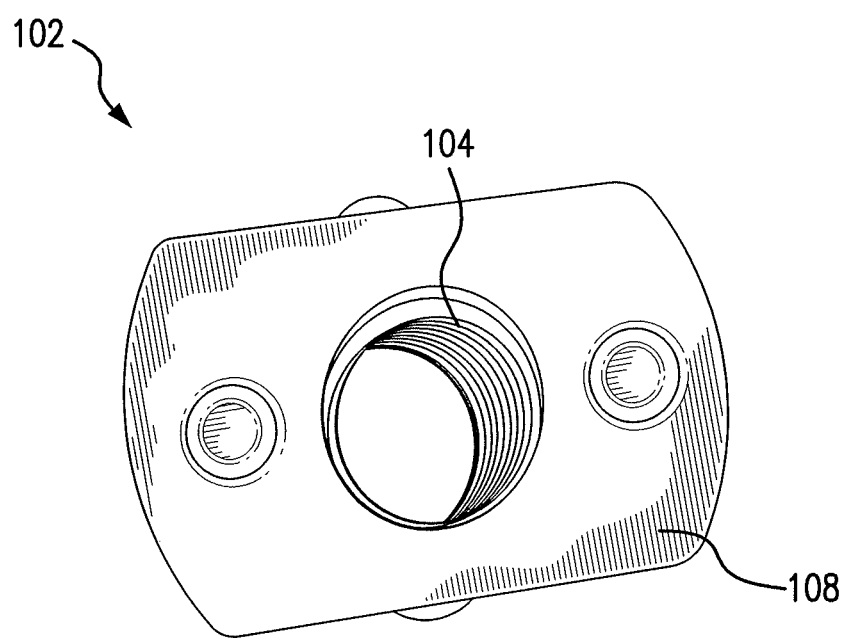

FIGS. 1A and 1B illustrate an example nutplate 102 and surface 112, according to a particular embodiment. In some embodiments, nutplate 102 is joined to surface 112 such that one or more bolts, screws, rivets, or other fasteners can pass through both surface 112 and nutplate 102, attach to nut 104 of nutplate 102, and thus attach, secure, or otherwise affix surface 112 in place or to another surface or component. In particular embodiments, nutplate 102 contains nut 104 and plate 106, where plate 106 has a faying surface 108. In addition, in some embodiments, nutplate 102 has a worm 110 passing through nut 104 and plate 106.

Nutplate 102 is generally a component that allows a nut, e.g., nut 104, to be positioned on or in close proximity to a surface, e.g. surface 112. Nutplate 102, in certain embodiments, contains plate 106 and nut 104, where nutplate 102 attaches to a surface, e.g., surface 112, via a connection between plate 106 and surface 112 at faying surface 108. For example, an adhesive may be placed between plate 106 and surface 112 such that plate 106 (and thus nutplate 102) is bonded to surface 112. Any suitable nutplate of any suitable configuration is contemplated. As examples, nutplates having nuts that accept 6/16", 5/16", 4/16", 3/16" etc. bolts may be used. Additional examples include open style nutplates and dome nutplates.

Nut 104 generally acts as a location for fasteners, such as bolts, screws, rivets, etc. to attach/fasten. A "nut" as used in this application may be any suitable location for a fastener, for example a component with a cylindrical/circular, rectilinear, or hexagonal opening that allows a fastener to at least partially pass through the opening and attach to the nut. For example, nut 104 may have threads for a bolt or screw on its inside surface (this area in FIG. 1 is filled with worm 110). In an example nutplate 102, nut 104 is attached to plate 106 via any suitable means, such as welding, press fitting, use of adhesives, etc. In some embodiments, nut 104 is coupled to plate 106 in such a way that allows nut 104 to be free floating (e.g., nut 104 may rotate or tilt a limited amount to accommodate certain tolerances). In certain embodiments, a face or portion of nut 104 may extend through a portion of plate 106 (e.g., such that a face of nut 104 is flush with plate 106), such that the surface or portion of nut 106 is a faying surface or part of a larger faying surface (such as faying surface 108). Nut 104 can be made of any suitable material such as steel, aluminum, or other metals, a metal alloy, polymer, ceramic, etc.

Plate 106 generally provides a surface to which nut 104 can attach, and a surface to which a surface (e.g., surface 112) can attach to nutplate 102. In example embodiments, plate 106 may have an opening centered with (or otherwise over) an opening of nut 104 that allows a fastener to pass through plate 106 and make contact with nut 104. Plate 106 can be made of any suitable material such as steel, aluminum, or other metals, a metal alloy, polymer, ceramic, etc.

Faying surface 108 is generally a surface of plate 106 that attaches to another surface, such as surface 112. Faying surface 108 may attach to surface 112 via any suitable means, such as with an adhesive, welding, press fitting, etc. In certain embodiments, faying surface 108 should be clean (e.g., have few contaminants on its surface) such that a strong bond (e.g., via use of an adhesive) can form between plate 106 and surface 112. Faying surface 108, in certain embodiments, may include some of nut 104, such as a face of nut 104 protruding through a portion of plate 106. In some embodiments, the cleaner faying surface 106, the stronger the bond between nutplate 102, via plate 106, and surface 112.

Worm 110 generally provides the ability to manipulate nutplate 102 and keeps the inside surface(s) of nut 104 (where, e.g., a fastener fastens to nut 104) clean and free of debris or other contaminants. For example, worm 110 may extend past plate 106 and pass through an opening in surface 112 such that an operator or device can grab worm 110 and pull it further through the opening of surface 112, thereby seating faying surface 108 on surface 112 and aligning the opening in surface 112, plate 106 and nut 104. Worm 110 may also extend below nut 104 in some embodiments. In certain embodiments, once nutplate 102 is attached to surface 112, worm 110 can be removed from nutplate 102, thus exposing inside surfaces of nut 104 and allowing a fastener to fasten to nut 104. In addition, in some embodiments, worm 110 keeps the inside surface(s) of nut 104 (e.g., threads for a bolt) clean by keeping debris, oil, and other contaminants off of the inside surface(s) of nut 104. Worm 110 can be made of any suitable substance, such as silicone, rubber, polymer, wax, etc.

Surface 112 is generally any surface to which nutplate 102 can attach. In certain embodiments, surface 112 may have an opening that a fastener can pass through, and nutplate 102 can attach to surface 112 such that openings in plate 106 and nut 104 align with the opening in surface 112. In such embodiments, the fastener may be able to pass through surface 112, plate 106, at least partially through nut 104, and fasten to nut 104. In an example embodiment, surface 112 may be an outer panel of an aircraft wing with an opening for a bolt, and nutplate 102 may attach to the inside of the aircraft wing such that the bolt can pass through surface 112 and be threaded into or out of the nutplate from the outside of the wing.

Figure 2:
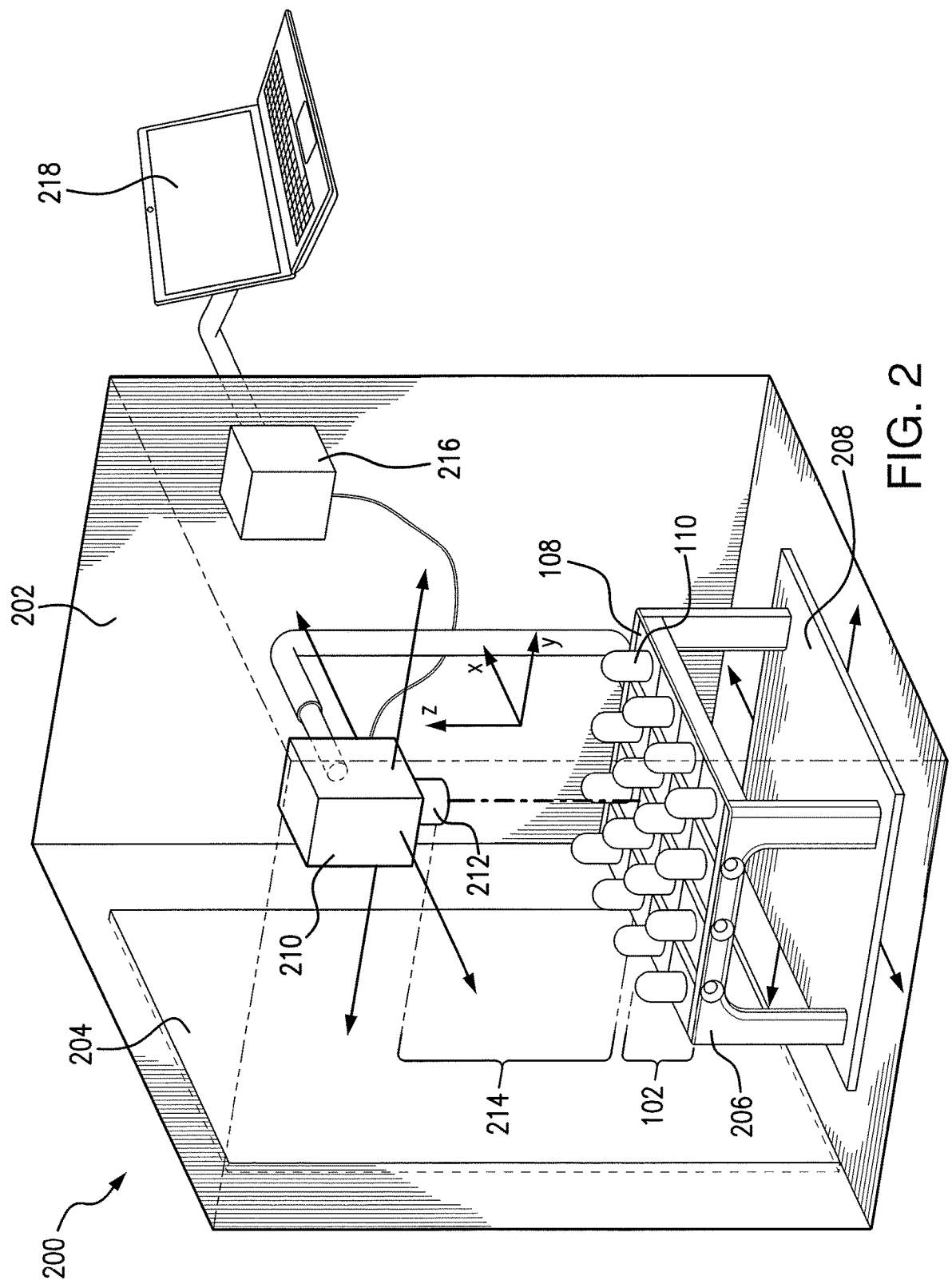
FIG. 2 illustrates an example laser system for cleaning nutplates, according to a particular embodiment.

FIG. 2 illustrates an example laser system 200 for cleaning nutplates, according to a particular embodiment. In general, laser system 200 cleans a faying surface of nutplates, such as faying surface 108, to prepare nutplates before attaching them to a surface, e.g., surface 112 of FIG. 1. For example, laser system 200 may clean or otherwise remove contaminants from a faying surface of nutplate, which may be referred to as laser ablation, such that an adhesive can be placed on the cleaned faying surface and more readily or strongly bond to the faying surface. In certain embodiments, laser system 200 contains a container 202 with a door 204, where inside container 202 a nutplate tray 206 holding nutplates 102 rests on a conveyor 208, and a laser 210 having a lens 212 faces nutplates 102 at a distance 214 from nutplates 102. In addition, laser system 200 contains a controller 216 and a terminal 218.

Container 202 generally contains some or all of the components of laser system 200 (also referred to as a nutplate laser cleaning system) and, in certain embodiments, protects operators of system 200 from potentially harmful exposure to laser 210. Container 202 can be made of any suitable material, such as metal, polymer, glass, etc. and may be opaque, transparent, semi-transparent, or any combination thereof.

Container 202 in some embodiments has a door 204, wherein door 204 provides access to the inside of container 202 (e.g., allows for nutplates to be placed in container 202 or removed from container 202) and increases the safety of laser system 200 by protecting operators from laser 210 when door 204 is closed. Door 204 can be made of any suitable material, such as metal, polymer, glass, etc. and may be opaque, transparent, semi-transparent, or any combination of thereof.

In certain embodiments, container 202 may contain or connect to a vacuum system that creates a complete or partial vacuum (or otherwise reduces the pressure) in container 202. Such a vacuum system may remove air, dust, and other matter that can settle on nutplates 102, scatter or otherwise interfere with laser 210, or chemically react with the faying surfaces during cleaning.

Nutplate tray 206 generally holds nutplates 102 during the laser cleaning process. In certain embodiments, nutplate tray 206 is configured to hold nutplates of a specific shape. Nutplate tray 206 may be customized for particular nutplate type(s)/shape(s), or contain different customized inserts for different nutplate types/shapes, e.g., in order to hold nutplates 102 steady and such that faying surface 108 is a particular distance from laser 210 or laser lens 212. For example, nutplate tray 206 may be able to hold 16 nutplates of one or more shapes or styles (e.g., open style or dome) in a four by four arrangement. Nutplate tray 206 may also, in some embodiments, allow for worm 110 and nut 104 of nutplate 102 to extend below nutplate tray 206. In certain embodiments, nutplate tray 206 is configured to hold nutplates such that the faying surfaces 108 of the nutplates 102 are facing (oriented) toward laser 210. Furthermore, nutplate tray 206, in some embodiments, may hold faying surfaces 108 of nutplates 102 at a particular distance 214 (e.g., a focal distance of lens 212) from laser lens 212, such that, for example, laser 210 (or a laser beam generated by laser 210) is at its maximum intensity for a given output while using lens 212 (or within 1%, 2%, 5%, 10%, 25%, 50%, etc. of its maximum intensity) at the distance between laser lens 212 and faying surfaces 108. Nutplate trays 206 of different heights may be used to change distance 214 in certain embodiments, such as to get closer to the focal distance of lens 212. Nutplate tray 206 may be made out of any suitable material such as metal, polymer, etc. and may be made by any suitable means such as dynamically being created by a 3D printer in response to a new batch of nutplates arriving or being scheduled to arrive.

In certain embodiments, nutplate tray 206 may be configured to hold nutplates 102 such that each faying surface of nutplates 102 is oriented such that a laser beam produced by laser 210 is capable of contacting each faying surface at least once during a cleaning cycle. A cleaning cycle may contain any number of movements of any number of components of laser system 200, such as multiple passes of laser 210 created by laser 210 moving and/or nutplate tray 206 moving (e.g., via conveyor 208) such that laser 210 cleans multiple nutplates.

Conveyor 208 generally moves nutplate tray 206 during cleaning to help clean multiple nutplates 102. For example, in some embodiments, conveyor 208 moves nutplate tray 206 in one or more directions such that a laser beam from laser 210 makes contact with and cleans multiple (or all) faying surfaces 108 of nutplates 102 in nutplate tray 206. In certain embodiments, conveyor 208 translates nutplate 206 in the X and Y directions (2D) such that the distance 214 between faying surface 108 and lens 212 (e.g., a focal distance of lens 212) is constant for multiple nutplates 102, which may increase the consistency and effectiveness of cleaning nutplates 102. In some embodiments, conveyor 208 may move nutplate tray 206 in the Z direction or in no direction. Conveyor 208, in some embodiments, may move nutplate tray 206 according to instructions from controller 216. While conveyor 208 moves nutplate tray 206 (or remains stationary), laser 210 may be stationary or may be moving in the X, Y, or Z direction.

Figure 3:
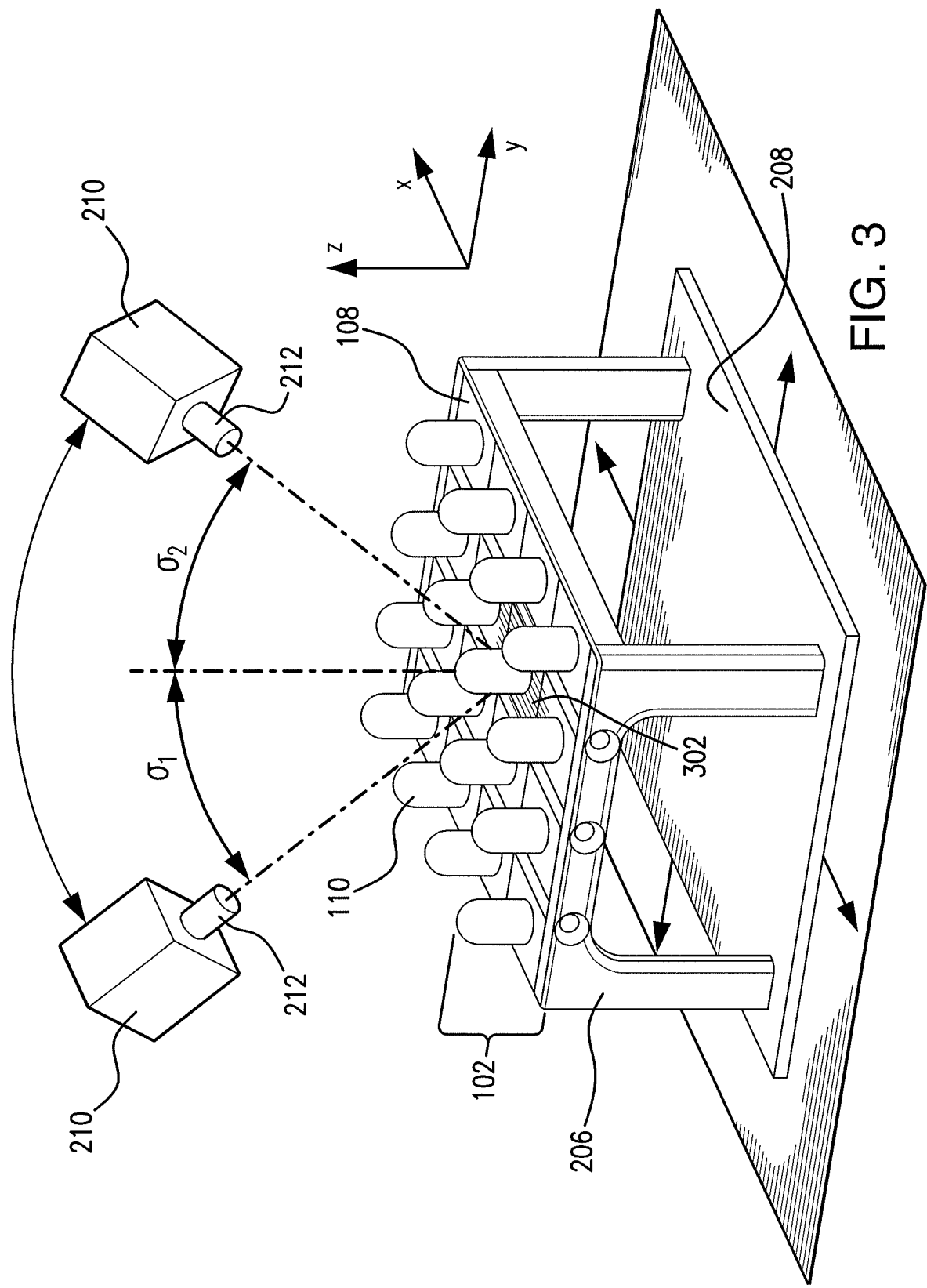
FIG. 3 illustrates an example of certain components of the laser system of FIG. 2 while conducting multiple passes to clean nutplates, according to a particular embodiment.

Laser 210 generally produces a laser (also described as a laser beam) directed towards nutplates 102, particularly faying surfaces 108. The laser beam produced by laser 210 impacts faying surface 108 in certain embodiments and removes some or all contaminants from faying surface 210. The process of cleaning nutplate faying surfaces 108 with a laser may be referred to as a form of laser ablation. In certain embodiments, laser 210 produces a laser beam that is orthogonal to faying surface 108 or any suitable angle to faying surface 108. Laser 210 may also make multiple passes (e.g., by laser 210 moving, nutplate tray 206 moving, or both) at the same nutplate at the same or different angles. FIG. 3 describes example embodiments where multiple passes of laser 210 occur at different angles.

In an example embodiment, laser 210 is a Nd:YAG (neodymium-doped yttrium aluminum garnet) class 1 or class 4 laser producing a laser beam with a wavelength of 1064 nm (nanometers), though any suitable laser of any type, class, or wavelength can be used to clean nutplates 102 (e.g., faying surface 108). For example, a suitable laser beam may have a wavelength of between 100 nm and 7,000 nm, 500 nm and 3,000 nm, 800 nm and 2000 nm, 1000 nm and 1200 nm, 1000 nm and 1100 nm, 1050 nm and 1075 nm, or any other suitable range.

A laser beam produced by laser 210 may be any suitable type of laser beam. For example, the laser beam may be a pulse laser. Certain embodiments of the present disclosure contemplate using or modifying characteristics of laser beams produced by laser 210, such as mark speed (how fast the laser moves back and forth across an area), angle, intensity, beam width, pulse frequency, etc. In certain embodiments, controller 216 controls some or all laser characteristics, automatically or based on user input. In other embodiments, laser characteristics or laser position may be manipulated manually.

In some embodiments, laser 210 can move in space relative to nutplates 102 and nutplate tray 206. For example, laser 210 may be able to move in the X, Y, Z, or any combination of these directions. In addition, laser 210 may tilt at any angle. In certain embodiments, the movement of laser 210 is controlled by controller 216. Laser 210 may move across nutplate tray 206 (which may include tilting) at one or more angles and one or more times (passes) in certain embodiments. Laser 210 may be pointed down at faying surfaces 108, but any orientation of laser 210 and faying surfaces 108 are contemplated, e.g., where laser 210 is pointed in the Y direction toward a nutplate tray that is mounted on the X-Z plane of FIG. 2. All other components of laser system 200 may be moved in relation to one another to accommodate any suitable setup.

Lens 212 generally focuses a laser beam emitted from laser 210. In certain embodiments, lens 212 has a focal distance, such that at the focal distance away from lens 212 a laser beam generated by laser 210 passing through the lens will have maximum intensity (energy per unit area) for any given power output from laser 210. A faying surface 108 that is a focal distance away from lens 212 (where distance 214 equals a focal distance of lens 212) will therefore encounter a laser beam produced by laser 210 at its maximum intensity in certain embodiments. In some embodiments, distance 214 may be at such a focal distance or within 1%, 2%, 5%, 10%, 25%, 50%, etc. of the focal distance. Lens 212 is connected to laser 210 in certain embodiments, for example by threading onto laser 210. Different lenses may have different focal distances. In one example, a 330 mm lens may be used, though any suitable lens of any suitable size (e.g., between 100 mm and 1000 mm, 200 mm and 500 mm, 300 mm and 400 mm, etc.) may be used.

Distance 214 is generally the distance between lens 212 and a faying surface 108 that is in contact with a laser beam produced by laser 210. Put another way, distance 214 is generally the distance between (1) a point where a laser beam from laser 210 contacts a surface (e.g., faying surface 108) and (2) lens 212. In particular embodiments, distance 214 is selected to provide sufficient or optimal cleaning of a faying surface 108. In certain embodiments, distance 214 may be equal to the focal distance of lens 212, and at such a distance 214 a laser beam passing through lens 212 is at its maximum intensity. Distance 214 may be any suitable distance, for example within 1%, 2%, 5%, 10%, 25%, 50%, etc. of the focal distance of lens 212. Distance 214 may change over time, and the placement of laser 210 and nutplate tray 206, the height of nutplate tray 206, and the position of conveyor 208 may affect distance 214.

Controller 216 generally controls some or all of the components of laser system 200. For example, controller 216 may control the position (including the angle) of laser 210, the position of conveyor 208 (and nutplate tray 206), the speed of laser 210 and/or conveyor 208, the pattern of movement of laser 210 and/or conveyor 208, characteristics of laser beams produced by laser 210, or any other component of laser system 200. Controller 216 may contain a processor and/or memory of any suitable type, including any kind of non-transient computer readable medium. Such processor and memory resources may be located locally within controller 216, within other components of laser system 200, or external to laser system 200 as a network resource (e.g., a private network, public network, or cloud computing resource). Controller 216 may also contain software (e.g., a program) for controlling components of laser system 200. Such software may be installed, modified, operated, or interacted with via terminal 218 or via a network.

Terminal 218 generally acts as an input/output device for controller 216. For example, terminal 218 may contain a display screen and a keyboard that allows a user to see the status of laser system 200 and enter commands to laser system 200. In certain embodiments, terminal 218 can be used to control or operate controller, 216. Terminal 218, in particular embodiments, may be a computer, such as a laptop, desktop, tablet, server, PDA, smartphone, or any other suitable device. In certain embodiments, terminal 218 may contain some or all of the processor and memory resources used by controller 216.

FIG. 3 illustrates an example of certain components of laser system 200 of FIG. 2 while conducting multiple passes to clean nutplates 102, according to a particular embodiment. More specifically, FIG. 3 illustrates laser 210 conducting two passes across a nutplate at angles θ1 and θ2.

Nutplates 102 are shown in this example embodiment as being held by nutplate tray 206 resting on conveyor 208. Nutplates 102 have faying surfaces 108 that are in the process of being cleaned by laser 210 having lens 212.

In this example, laser 210 is shown making two passes, the first at a first position having angle θ1 and the second at a second position having angle θ2. Generally, a single pass at any position having any angle (including 0°) could produce a shadow effect, where, e.g., worm 110 comes between a laser beam produced by laser 210 and faying surface 108, which produces an area that is not cleaned by laser 210 (a shadow area 302). To reduce or eliminate this shadow effect, laser 210 can make multiple passes over faying surface 108 at different positions (e.g. at θ1 and θ2), such that more or all of faying surface 108 is cleaned at least once by laser 210 than if just one pass were completed. Such multiple passes at different positions, e.g., having different angles may reduce or eliminate the shadow effect and shadow area 302.

Angles θ1 and θ2 may describe angles measures relative to any suitable axis, such as the X, Y, or Z axes as shown in FIG. 3, and in any suitable plane. For example, in the illustrated embodiment of FIG. 3, θ1 and θ2 are measured from the Z axis (orthogonal to faying surfaces 108 and located where the laser beam meets the faying surface) along the Z-Y plane. Angles θ1 and θ2 may be any suitable angle, including 0°, and may change over time during a particular pass of between particular passes.

In certain embodiments, the laser system of FIG. 2 may conduct a cleaning cycle, e.g., containing one or more passes of laser 210 across faying surfaces 108 of nutplates 102 held by nutplate tray 206. In some embodiments, nutplate tray 206 holds nutplates 102 such that a faying surface of each nutplate 102 is accessible by a laser beam produced by laser 210 for cleaning at least once during the cleaning cycle, whether on the same pass of laser 210 or one different passes of laser 210 during the cleaning cycle.

While FIG. 3 describes particular embodiments, any number of passes of laser 210 (or multiple lasers) having any position, including any angle, are contemplated.

While particular embodiments of laser system 200 have been described in reference to cleaning faying surfaces 108 of nutplates 102, other embodiments of laser system 200 may be used to clean faying surfaces of any other appropriate part (e.g., small parts with surfaces that are typically abrasively cleaned). For example, some embodiments of laser system 200 may be used to clean parts such as radius blocks, shims, click bond studs, brackets, and the like. In such embodiments, tray 206 may be customized for the shape of the particular parts in order to hold the parts steady during cleaning and such that faying surfaces of the parts are a particular distance from laser 210 or laser lens 212.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or."

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising
    disposing a manipulating worm through each one of a pluarlity of parts;
    placing the plurality of parts in a tray configured to hold the plurality of parts such that each manipulating worm extends through the tray;
    orienting the tray such that a faying surface of each of the plurality of parts is oriented such that a laser beam from a laser is capable of contacting each faying surface at least once during a cleaning cycle; and
    conducting the cleaning cycle, comprising:
        producing, by the laser, the laser beam capable of cleaning the faying surface of each of the plurality of parts;
        conducting a first pass to clean each of the faying surfaces, wherein the laser is at a first position having a first angle relative to an axis orthogonal to the faying surfaces during the first pass; and
        moving, by a conveyor, the tray during the first pass, wherein the conveyor is configured to move in the X, Y, and Z directions in response to receiving instructions from a controller, wherein the tray is disposed on the conveyor.

2. The method of claim 1, wherein conducting the cleaning cycle further comprises conducting a second pass to clean each of the clean surfaces, wherein the laser is at a second position having a second angle relative to an axis orthogonal to the faying surfaces during the second peas; and
    wherein the first angle is different from the second angle.

3. The method of claim 1, further comprising moving the laser during the first pass, wherein the laser is configured to move in the X, Y, and Z directions and to tilt at any angle in response to receiving instructions from the controller.

4. The method of claim 1, wherein
    a lens is attached to the laser such that the laser beam passes through the lees, wherein the lens has a focal distance; and
    wherein a distance between the lens and a point where the laser beam contacts one of the faying surfaces is within 10 percent of the focal distance.

5. The method of claim 1, wherein the plurality of part comprises:
    a plurality of radius blocks;
    a plurality of shims;
    a plurality of click bond studs; or
    a plurality of brackets.

6. The a method or claim 1, wherein the laser is configured to produce a laser beam having a wavelength of between 800 nm and 2000 nm.

7. One or more non-transitory computer-readable media comprising logic, the logic when executed by one or more processors operable to perform operations comprising:
    orienting a nutplate tray configured to hold a plurality of nutplates, wherein there is a nutplate worm disposed through each of the plurality of nutplates, wherein each nutplate worm extends through the nutplate tray, such that a faying surface of each of the plurality of nutplates is oriented such that a laser beam from a laser is capable of contacting each faying surface a least once during a cleaning cycle; and
    conducting the cleaning cycle, comprising:
        producing, by the laser, the laser beam capable of cleaning a faying surface of each of a plurality of nutplates;
        conducting a first pass to clean each of the faying surfaces, wherein the laser is at a first position having a first angle relative to man axis orthogonal to the faying surfaces during the first pass; and
        moving, by a conveyor, the nutplate tray during the first pass, wherein the conveyor is configured to move in the X, Y, and Z directions in response to receiving instructions from a controller, wherein the nutplate tray is disposed on the conveyor.

8. The computer-readable media of claim 7, wherein:
    conducting the cleaning cycle further comprises conducting a second pass to clean each of the flying surfaces, wherein the laser is at a second position having a second angle relative to man axis orthogonal to the faying surfaces during the second pass; and
    the first angle is different from the second angle.

9. The computer-readable media of claim 7, wherein the computer-readable media is further operable when executed to perform operations comprising moving the laser during the first pass, wherein laser is configured to move in the X, Y, ad Z directions and to tilt at any angle in response to receiving instructions from the controller.

10. The computer-readable media of claim 7, wherein:
    a lens is attached to the laser such that the laser beam passes through the lens, wherein the lens has a focal distance; and
    a distance between the lens and a point where the laser beam contacts one of the faying surfaces is within 10 percent of the focal distance.

11. The computer-readable media of claim 7, wherein the laser is configured to produce a laser beam having a wavelength of between 800 nm and 2000 nm.

* * * * *